United States Patent
Watanabe

(10) Patent No.: US 10,753,433 B2
(45) Date of Patent: Aug. 25, 2020

(54) TENSIONER

(71) Applicant: TSUBAKIMOTO CHAIN CO., Osaka-shi, Osaka (JP)

(72) Inventor: Masanori Watanabe, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 317 days.

(21) Appl. No.: 15/926,191

(22) Filed: Mar. 20, 2018

(65) Prior Publication Data

US 2018/0274636 A1 Sep. 27, 2018

(30) Foreign Application Priority Data

Mar. 21, 2017 (JP) .................. 2017-054337

(51) Int. Cl.
*F16H 7/08* (2006.01)
*F16H 7/14* (2006.01)

(52) U.S. Cl.
CPC ............ *F16H 7/0836* (2013.01); *F16H 7/14* (2013.01); *F16H 2007/0808* (2013.01); *F16H 2007/0814* (2013.01); *F16H 2007/0876* (2013.01)

(58) Field of Classification Search
CPC ..... F16H 2007/0806; F16H 2007/0859; F16H 2007/0814; F16H 2007/0812; F16H 7/0848
USPC ........................................................ 474/110
See application file for complete search history.

(56) References Cited

U.S. PATENT DOCUMENTS

| | | | | |
|---|---|---|---|---|
| 2,755,816 A * | 7/1956 | Collins | .................. | F16K 15/063 137/496 |
| 4,874,352 A * | 10/1989 | Suzuki | .................. | F16H 7/0848 474/110 |
| 5,183,075 A * | 2/1993 | Stein | ..................... | F02M 59/462 137/493.6 |
| 5,860,881 A * | 1/1999 | Tada | ......................... | F16H 7/08 474/101 |
| 5,879,256 A * | 3/1999 | Tada | ......................... | F16H 7/08 474/110 |
| 6,193,623 B1 * | 2/2001 | Koch | .................... | F16H 7/0836 474/110 |
| 6,322,468 B1 * | 11/2001 | Wing | ........................ | F16H 7/08 474/109 |

(Continued)

FOREIGN PATENT DOCUMENTS

JP 2001-12569 A 1/2001

*Primary Examiner* — Henry Y Liu
(74) *Attorney, Agent, or Firm* — Westerman, Hattori, Daniels & Adrian, LLP

(57) ABSTRACT

An object of the present invention is to provide a tensioner capable of keeping the oil pressure in an oil pressure chamber stable in a favorable manner. Provided is a tensioner wherein a relief mechanism includes a partition part, a valve member at least partly positioned inside an internal relief hole such as to be able to approach and separate from an oil pressure chamber, a valve biasing unit, and an external relief hole. A movement restricting part that restricts movement of the valve member toward the oil pressure chamber is formed in the partition part. An oil passing groove is formed in at least one of an outer circumferential surface of the valve member and an inner circumferential surface of the internal relief hole, the outer circumferential surface and the inner circumferential surface facing each other.

7 Claims, 8 Drawing Sheets

(56) References Cited

U.S. PATENT DOCUMENTS

| | | | | |
|---|---|---|---|---|
| 6,361,458 B1* | 3/2002 | Smith | F16H 7/0848 | 474/109 |
| 6,383,103 B1* | 5/2002 | Fujimoto | F01L 1/02 | 474/109 |
| 6,398,682 B1* | 6/2002 | Suzuki | F16H 7/08 | 474/110 |
| 6,592,479 B2* | 7/2003 | Nakakubo | F16H 7/0848 | 474/109 |
| 6,810,907 B2* | 11/2004 | Hashimoto | F16H 7/0848 | 137/514.5 |
| 7,618,339 B2* | 11/2009 | Hashimoto | F01L 1/02 | 474/109 |
| 7,699,730 B2* | 4/2010 | Emizu | F16H 7/0836 | 474/110 |
| 7,775,923 B2* | 8/2010 | Sato | F16H 7/0836 | 474/109 |
| 7,775,924 B2* | 8/2010 | Koch | F16H 7/0848 | 251/337 |
| 8,317,643 B2* | 11/2012 | Hofmann | F16H 7/0848 | 474/101 |
| 8,561,638 B2* | 10/2013 | Yamaguchi | B60K 15/03519 | 137/493.6 |
| 8,574,106 B2* | 11/2013 | Botez | F16H 7/0848 | 474/110 |
| 8,585,519 B2* | 11/2013 | Hartmann | F16H 7/0836 | 474/110 |
| 9,212,730 B2* | 12/2015 | Tyroller | F16H 7/0836 | |
| 9,523,414 B2* | 12/2016 | Chekansky | F16H 7/08 | |
| 10,253,852 B2* | 4/2019 | Fischer | F16H 7/0836 | |
| 10,323,730 B2* | 6/2019 | Kunimatsu | F16H 7/0836 | |
| 2002/0052259 A1* | 5/2002 | Nakakubo | F16H 7/0848 | 474/109 |
| 2007/0270259 A1* | 11/2007 | Koch | F16H 7/0848 | 474/110 |
| 2008/0015069 A1* | 1/2008 | Kroon | F16H 7/0836 | 474/110 |
| 2010/0004080 A1* | 1/2010 | He | F16K 17/0406 | 474/110 |
| 2010/0093474 A1* | 4/2010 | Onimaru | F16H 7/0848 | 474/110 |
| 2011/0237370 A1* | 9/2011 | Hartmann | F16H 7/0836 | 474/110 |
| 2011/0263366 A1* | 10/2011 | Botez | F16H 7/0848 | 474/110 |
| 2013/0017913 A1* | 1/2013 | Hartmann | F16H 7/0848 | 474/110 |
| 2013/0303318 A1* | 11/2013 | Hofmann | F16H 7/08 | 474/110 |
| 2013/0345002 A1* | 12/2013 | Tyroller | F16H 7/0836 | 474/110 |
| 2016/0327135 A1* | 11/2016 | Fischer | F16H 7/0836 | |

\* cited by examiner

RELATED ART

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism, which slidably guides a drive chain such as an endless roller chain passing over respective sprockets of a crankshaft and of a cam shaft inside an engine room, uses a tensioner to bias a tensioner lever in order to maintain appropriate tension of the chain or the like.

One known tensioner 510 used in such a chain guide mechanism includes, as shown in FIG. 7, a plunger 520 having a plunger hole 521 that is open on the rear side, a housing 530 having a plunger bore 531 that is open on the front side for accommodating the plunger 520, a relief mechanism 550 that releases oil in an oil pressure chamber 511 to the outside of the plunger 520 when oil pressure in the oil pressure chamber 511 builds up, and a main spring 560 that is accommodated so as to freely expand and contract in the oil pressure chamber 511 formed between the plunger 520 and the plunger bore 531 and that biases the plunger 520 toward the front side (see, for example, Japanese Patent Application Laid-open No. 2001-12569).

In this tensioner 510 described in Japanese Patent Application Laid-open No. 2001-12569, a pressure passage 524 in communication with the oil pressure chamber 511, a discharge hole 523 that connects the pressure passage 524 with the outside of the plunger 520, and a spring accommodating space 525 formed on the front side of the pressure passage 524, are formed at the bottom of the plunger 520. The relief mechanism 550 is made up of a valve member 551 slidably fitted in the pressure passage 524, and a relief spring 552 disposed inside the spring accommodating space 525 to bias the valve member 551 toward the oil pressure chamber 511.

In this tensioner 510, when the oil pressure in the oil pressure chamber 511 rises, the valve member 551 moves forward against the biasing force of the relief spring 552 so that the pressure passage 524 communicates with the discharge hole 523 and the oil is released from the discharge hole 523.

SUMMARY OF THE INVENTION

One problem with such a tensioner 510 was that the oil pressure in the oil pressure chamber 511 sometimes varied largely due to the fluctuations in the force the plunger 520 received from the chain, or the variation in the amount of oil supplied to the oil pressure chamber 511. The tensioner 510 described in Japanese Patent Application Laid-open No. 2001-12569 could assume only two positions, i.e., one where the valve member 551 blocks the pressure passage 524 to stop release of oil to the outside of the plunger 520, and the other where the valve member 551 moves forward by the oil pressure from the oil pressure chamber 511 to allow the oil to be released from the discharge hole 523 to the outside of the plunger 520, because of which it was difficult to keep the oil pressure in the oil pressure chamber 511 stable.

The present invention solves these problems and it is an object of the invention to provide a tensioner that can keep the oil pressure in an oil pressure chamber stable in a favorable manner.

The present invention solves the problems described above by providing a tensioner including a plunger having a plunger hole that is open on a rear side, a housing having a plunger bore that is open on a front side and accommodates the plunger, a main biasing unit that is accommodated so as to freely expand and contract inside an oil pressure chamber formed between the plunger and the plunger bore and that biases the plunger toward the front side, and a relief mechanism that releases oil inside the oil pressure chamber to outside of the plunger when oil pressure in the oil pressure chamber rises. The relief mechanism includes a partition part that partitions an interior of the plunger hole into the oil pressure chamber and a relief space and that has an internal relief hole connecting the oil pressure chamber with the relief space, a valve member at least partly positioned inside the internal relief hole such as to be able to approach and separate from the oil pressure chamber, a valve biasing unit biasing the valve member toward the oil pressure chamber, and an external relief hole formed in the plunger and connecting the relief space with outside of the plunger. A movement restricting part that restricts movement of the valve member toward the oil pressure chamber is formed in the partition part. An oil passing groove is formed in at least one of an outer circumferential surface of the valve member and an inner circumferential surface of the internal relief hole, the outer circumferential surface and the inner circumferential surface facing each other.

According to one aspect of the present invention, when the oil pressure in the oil pressure chamber rises, the valve member is moved away from the oil pressure chamber by the rising oil pressure, so that the oil can be released from the oil pressure chamber into the relief space through between the valve member and the partition part. Moreover, the following effects can be achieved.

According to one aspect of the present invention, the oil passing groove is formed at least in one of the outer circumferential surface of the valve member, which is positioned inside the internal relief hole such as to be able to approach and separate from the oil pressure chamber, and in the inner circumferential surface of the internal relief hole that faces the outer circumferential surface of the valve member. This way, the flow resistance of the oil flow passage formed between the valve member and the partition part can be changed in accordance with the position of the valve member, by using the change in position of the valve member along the valve moving direction in accordance with the increase of the oil pressure in the oil pressure chamber. Thus the amount of released oil is adjusted in accordance with the oil pressure in the oil pressure chamber and the oil pressure in the oil pressure chamber is kept favorably stable.

According to another aspect of the present invention, the valve member and internal relief hole are formed such that, as the valve member moves away from the oil pressure chamber, an area where the outer circumferential surface of the valve member and the inner circumferential surface of the internal relief hole face each other decreases along a moving direction of the valve member. When the oil pressure in the oil pressure chamber rises, and the valve member moves away from the oil pressure chamber, the flow resistance of the oil passage formed between the valve member and the partition part is reduced, so that the amount of released oil can be increased gradually. Thus the oil pressure in the oil pressure chamber can be made stable in a favorable manner.

According to another aspect of the present invention, the oil passing groove is formed in the outer circumferential surface of the valve member. The valve member may be made of synthetic resin or the like so that the oil passing groove can be formed precisely without increasing the production cost, which leads to favorable control of the amount of released oil.

According to another aspect of the present invention, the plunger includes a plunger body having the plunger hole, and a cap member attached to a front end of the plunger body. The plunger body can thus be processed both from the front side and rear side and easily produced, even when the partition part, which includes a movement restricting part that restricts movement of the valve member toward the oil pressure chamber, is formed integrally on an inner circumferential wall of the plunger hole. Also, since the valve member and other components can be disposed inside the plunger body from the front side of the plunger body, assembling of components is easily achieved.

According to another aspect of the present invention, the valve body is columnar, and the internal relief hole is cylindrical. The valve member is thus favorably kept movable inside the internal relief hole, so that it can exhibit its relief function consistently.

DESCRIPTION OF THE PREFERRED EMBODIMENT

A tensioner 10 according to one embodiment of the present invention will be described with reference to the drawings.

Figure 1:
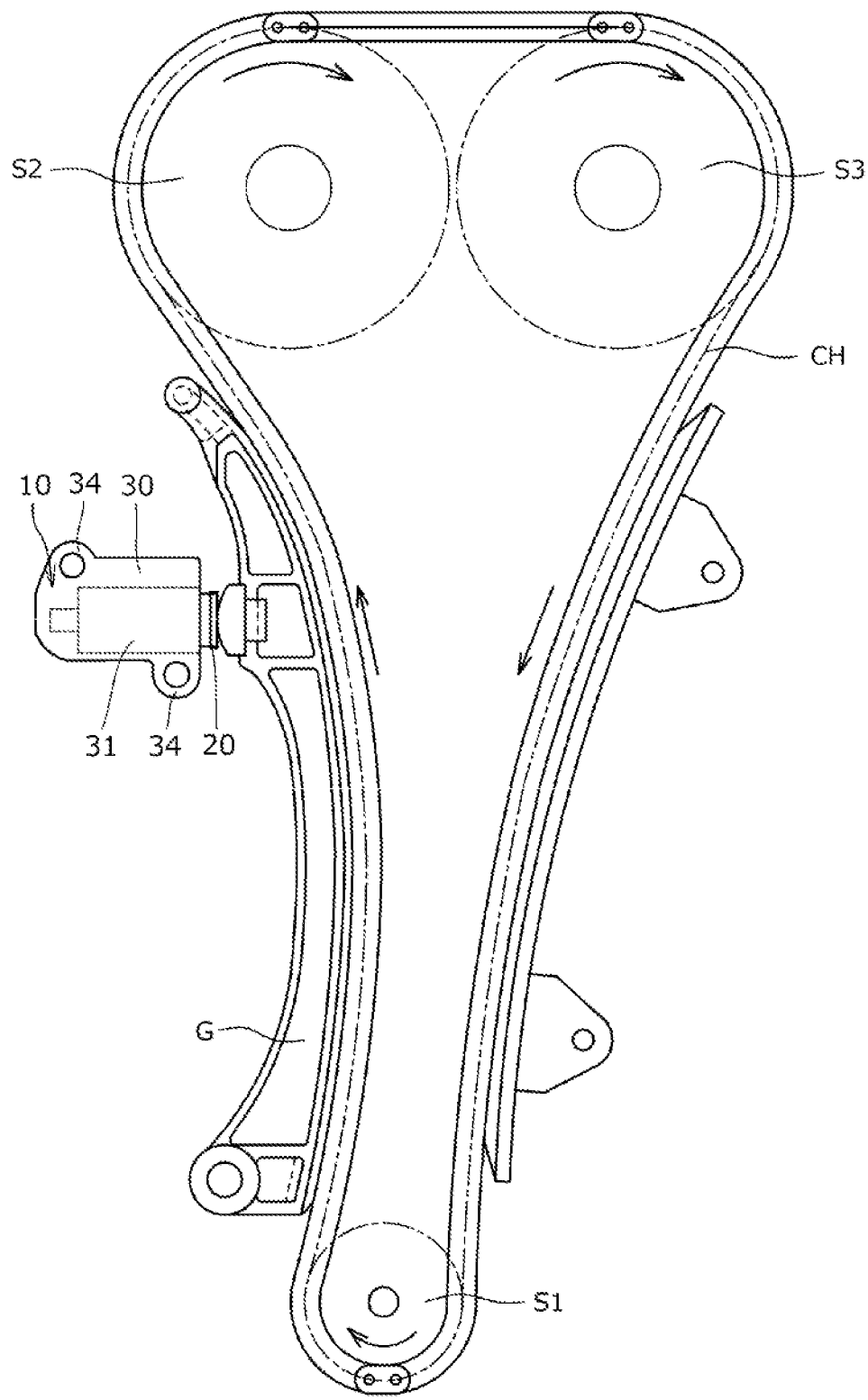
FIG. 1 is an illustrative diagram showing a timing system in which a tensioner according to one embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
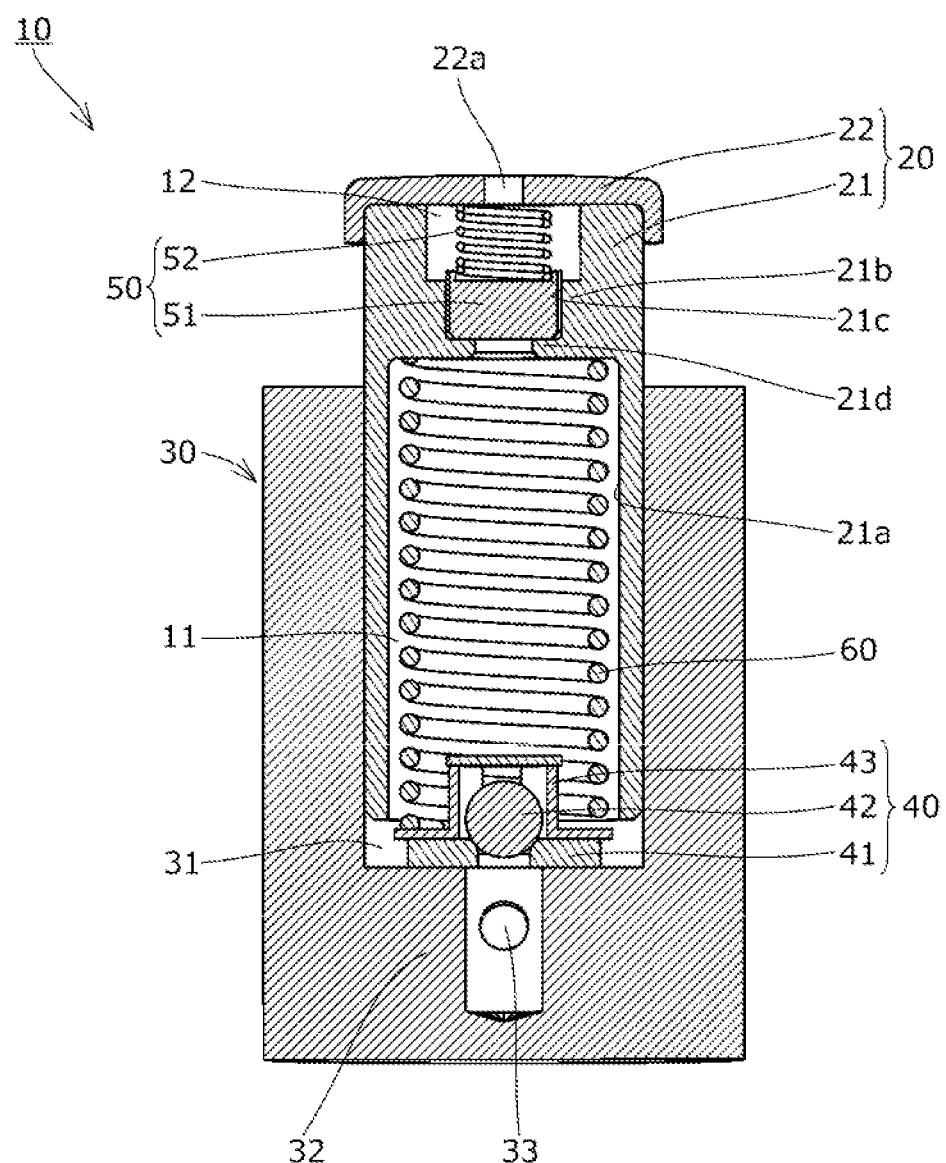
FIG. 2 is a cross-sectional view illustrating the tensioner.

The tensioner 10 includes, as shown in FIG. 2, a plunger 20 having a plunger hole 21a that is open on a rear side, a housing 30 having a plunger bore 31 that is open on a front side for accommodating the plunger 20, a check valve 40 disposed on the bottom part 32 side of the housing 30, a relief mechanism 50 that releases oil from the oil pressure chamber 11 to the outside of the plunger 20 when the oil pressure in the oil pressure chamber 11 rises, and a main spring (main biasing unit) 60 that is accommodated so as to freely expand and contract inside the oil pressure chamber 11 formed between the plunger 20 and the plunger bore 31 and that biases the plunger 20 toward the front side.

Hereinafter, various constituent elements of the tensioner 10 will be described with reference to the drawings.

Figure 4:
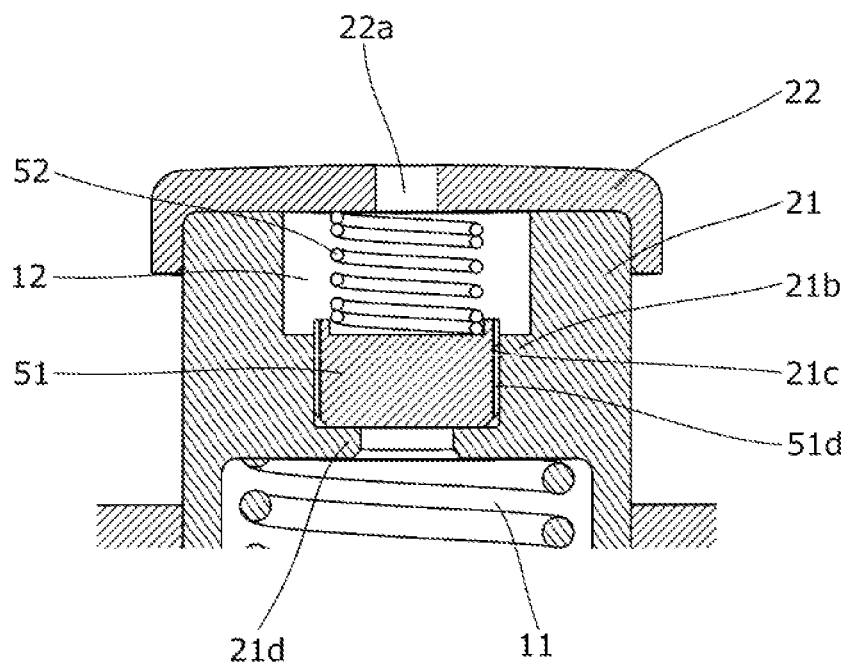
FIG. 4 is a cross-sectional view illustrating a state of a relief mechanism in normal operation.

The plunger 20 is made up of a cylindrical plunger body 21 having the plunger hole 21a, and a cap member 22 attached to the front end of the plunger body 21, as shown in FIG. 2 and FIG. 4. The plunger body 21 is made of metal such as iron, while the cap member 22 is made of synthetic resin, metal or the like.

The plunger body 21 has a partition part 21b that is integrally formed on the inner circumferential wall of the plunger hole 21a and divides the interior of the plunger hole 21a into the oil pressure chamber 11 on the rear side and a relief space 12 on the front side, as shown in FIG. 2 and FIG. 4.

The partition part 21b has a cylindrical internal relief hole 21c in a central part thereof that extends through in the front to back direction to connect the oil pressure chamber 11 with the relief space 12 as shown in FIG. 4.

Further, an annular movement restricting part 21d, which restricts rearward movement (toward the oil pressure chamber 11) of the valve member 51 disposed in the internal relief hole 21c, protrudes radially inward from the inner circumferential surface of the internal relief hole 21c in the partition part 21b.

The cap member 22 configures a bottom part at the front end of the plunger hole 21a as shown in FIG. 2 and FIG. 4. The cap member 22 is provided with an external relief hole 22a that connects the relief space 12 with the outside of the plunger 20.

The housing 30 includes, as shown in FIG. 1 and FIG. 2, a cylindrical plunger bore 31 that is open on the front side, a bottom part 32 formed on the rear side, an oil supply hole 33 formed in the bottom part 32 to extend through the outer wall of the housing 30 to the plunger bore 31, and a mounting part 34 for fixedly attaching the housing 30 to an engine block.

The check valve 40 allows the oil to flow into the oil pressure chamber 11 from the outside through the oil supply hole 33, and stops the oil from flowing out from the oil supply hole 33.

The check valve 40 is made up of, as shown in FIG. 2, a ball seat 41 disposed in tight contact with the front face of the bottom part 32 of the housing 30, a spherical check ball 42 that can be seated on the ball seat 41 in tight contact therewith, and a retainer 43 arranged on the front side of the check ball 42 to restrict the movement of the check ball 42. A ball spring that biases the check ball 42 toward the ball seat 41 may be disposed between the check ball 42 and the retainer 43.

The main spring 60 is disposed such that, as shown in FIG. 2, its front end is arranged on the rear face of the partition part 21b while its rear end is arranged on the front face of a flange part of the retainer 43. Thus the main spring 60 presses the ball seat 41 and retainer 43 against the bottom part 32 of the housing 30.

As shown in FIG. 2 and FIG. 4, the relief mechanism 50 is made up of the partition part 21b described above, a valve member 51, a valve spring (valve biasing unit) 52 that biases the valve member 51 toward the oil pressure chamber 11, and the external relief hole 22a mentioned above.

The valve member 51 is at least partly positioned inside the internal relief hole 21c such as to be able to move back and forth (to approach and separate from the oil pressure chamber 11).

Figure 3A:
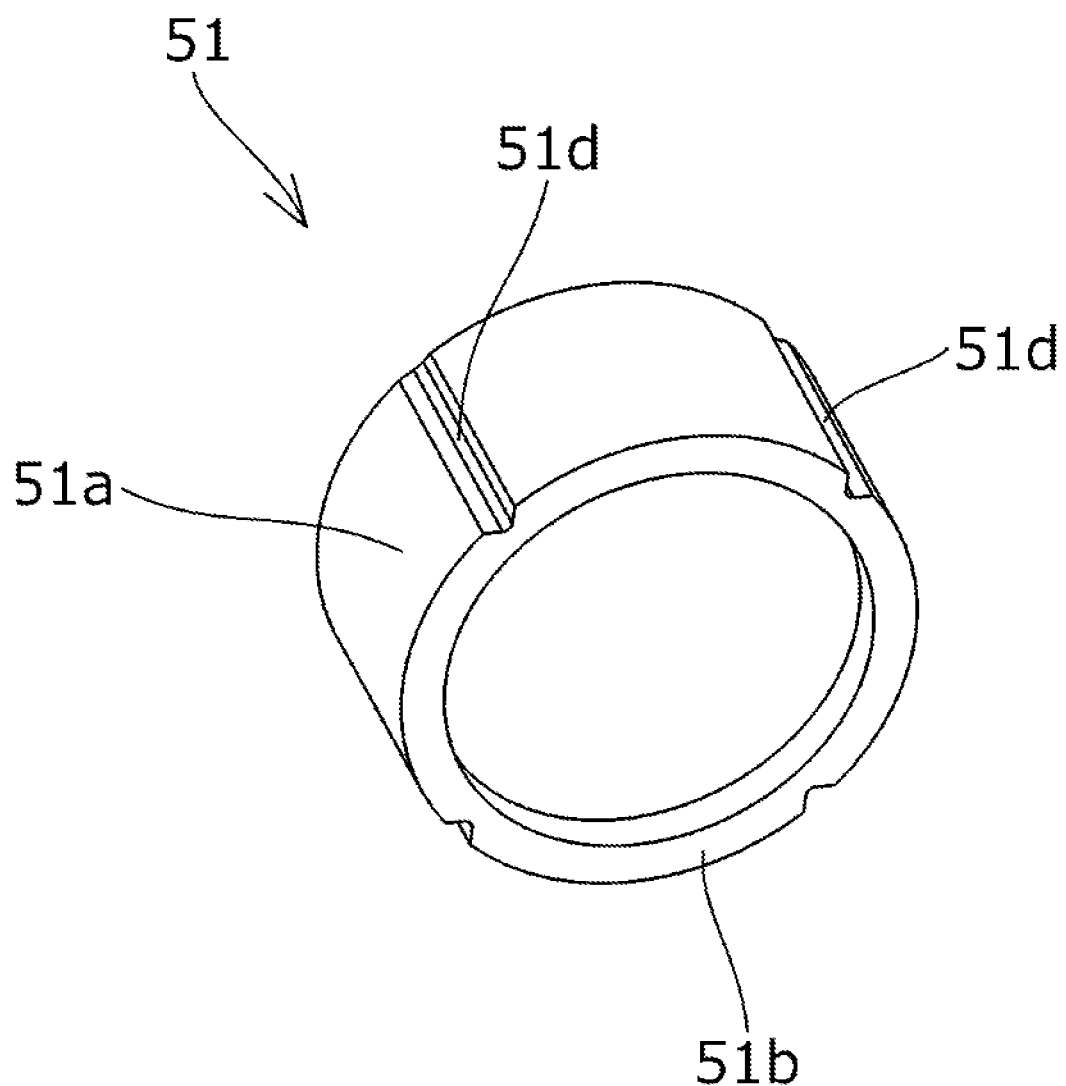
FIG. 3A is a perspective view illustrating a valve member.
Figure 3B:
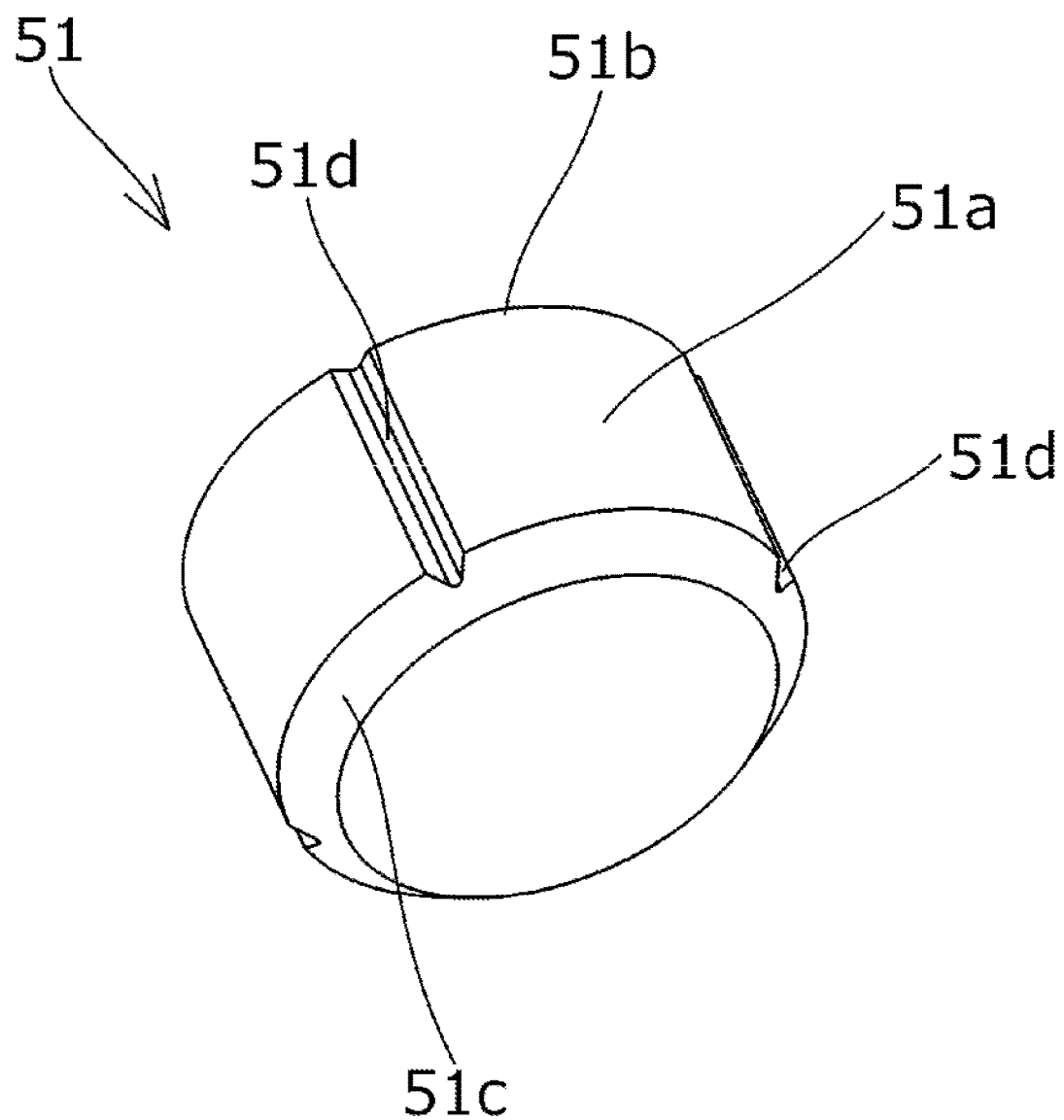
FIG. 3B is a perspective view illustrating the valve member.

As shown in FIG. 3A, FIG. 3B, and FIG. 4, the valve member 51 includes a columnar valve body 51a, a lip 51b formed on the outer peripheral edge of the front end face of the valve body 51a, a taper 51c formed on the outer peripheral edge of the rear end face of the valve body 51a, and a plurality of oil passing grooves 51d formed in the outer circumferential surface of the valve body 51a.

As shown in FIG. 3A and FIG. 3B, the oil passing grooves 51d are each formed as a V groove extending straight from the rear end to the front end of the valve body 51a along the front to back direction and circumferentially spaced (at 90° in this embodiment).

The taper 51c is formed such as to decrease in diameter from the front side to the rear side.

As shown in FIG. 4, the valve spring 52 has its front end disposed on the rear face of the bottom at the front end of the plunger hole 21a (cap member 22), and its rear end disposed on the front face of the valve member 51.

In normal operation of the tensioner 10 of this embodiment configured as described above, the rear end face (end face on the oil pressure chamber 11 side) of the valve body 51a is in contact with the movement restricting part 21d by the biasing force of the valve spring 52 as shown in FIG. 4, whereby a seal is formed between the rear end face of the valve body 51a and the movement restricting part 21d so that the oil in the oil pressure chamber 11 is prevented from leaking into the relief space 12.

Figure 5:
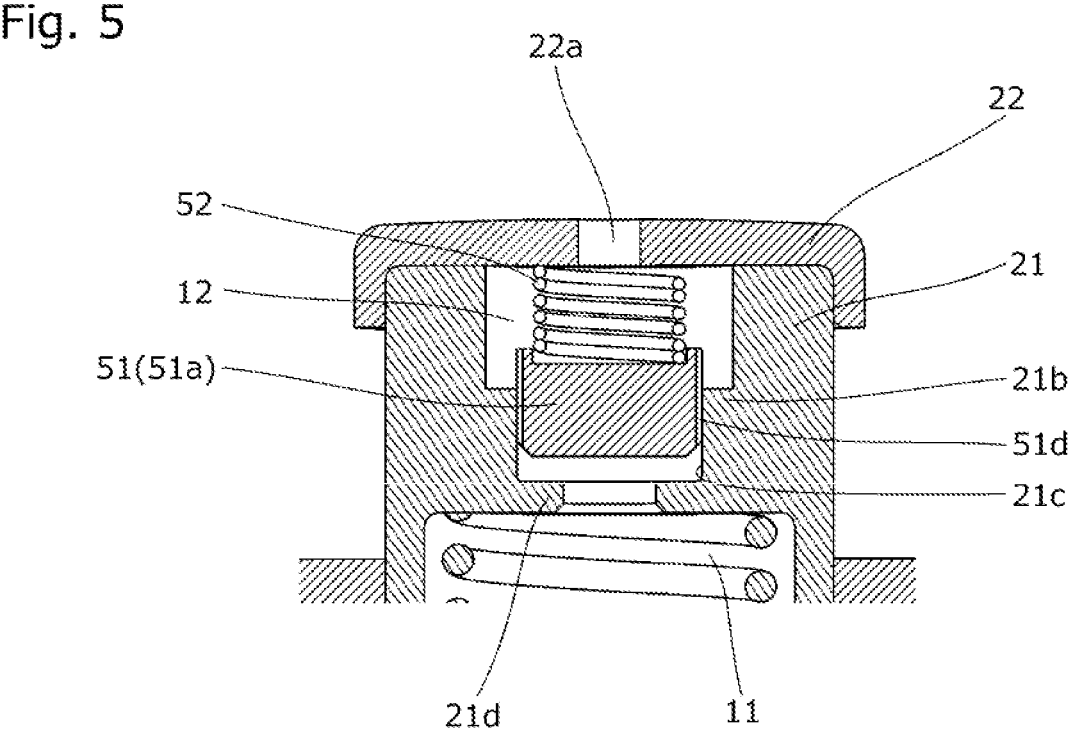
FIG. 5 is a cross-sectional view illustrating a state of the relief mechanism when oil pressure rises.

When the oil pressure in the oil pressure chamber 11 builds up, the valve member 51 is pushed and moves forward by the rising oil pressure in the oil pressure chamber 11 as shown in FIG. 5. As the rear end face of the valve body 51a and the movement restricting part 21d separate from each other, the seal between the valve member 51 and the movement restricting part 21d is removed, and the oil is released from the oil pressure chamber 11 into the relief space 12 through between the rear end face of the valve body 51a and the movement restricting part 21d, and through the oil passing grooves 51d formed in the outer circumferential surface of the valve member 51.

The valve member 51 and internal relief hole 21c are formed such that, as the valve member 51 moves away from the oil pressure chamber 11, the area where the outer circumferential surface of the valve member 51 and the inner circumferential surface of the internal relief hole 21c face each other decreases along the moving direction of the valve member 51 (front to back direction). Therefore, as the valve member 51 moves forward (away from the oil pressure chamber 11), the flow resistance of the oil passage formed between the valve member 51 and the partition part 21b is reduced, so that the amount of released oil can be increased gradually. Thus the oil pressure in the oil pressure chamber 11 can be made stable in a favorable manner.

While one embodiment of the present invention has been described in detail, the present invention is not limited to the above-described embodiment and may be carried out with various design changes without departing from the scope of the present invention set forth in the claims.

For example, while the tensioner 10 was described as a component to be incorporated in a timing system of a car engine in the embodiment described above, the purpose of use of the tensioner 10 is not limited to this specific application.

Also, while the tensioner 10 was described as a component that applies tension to a drive chain CH with a tensioner lever G in the embodiment described above, the plunger 20 can directly guide the drive chain CH slidably with a distal end thereof to apply tension to the drive chain CH.

The tensioner may not necessarily be applied to a transmission mechanism with a drive chain CH but can also be used for similar transmission mechanisms that use belts, ropes and the like, and can be applied in a variety of industrial fields where it is required to apply tension to an elongated component.

While the housing 30 accommodating the plunger 20 is described as the component known as a tensioner body that is attached to an engine block or the like in the embodiment described above, the housing 30 is not limited to the specific form described above and may be a cylindrical component known as a sleeve inserted into a body hole formed in the tensioner body.

In the embodiment described above, the oil passing grooves 51d are formed as grooves that extend straight along the front to back direction. The oil passing groove 51d is not limited to the specific form described above. For example, the oil passing groove 51d may be formed in a helical shape on the outer circumferential surface of the valve body 51a (spiral shape formed around the center axis of the valve body 51a that extends in the front to back direction).

Figure 6:
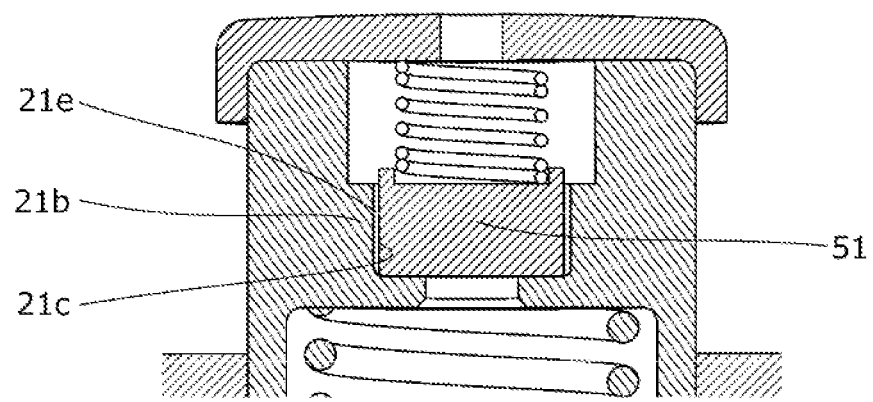
FIG. 6 is a cross-sectional view illustrating a variation example of the relief mechanism.
Figure 7:
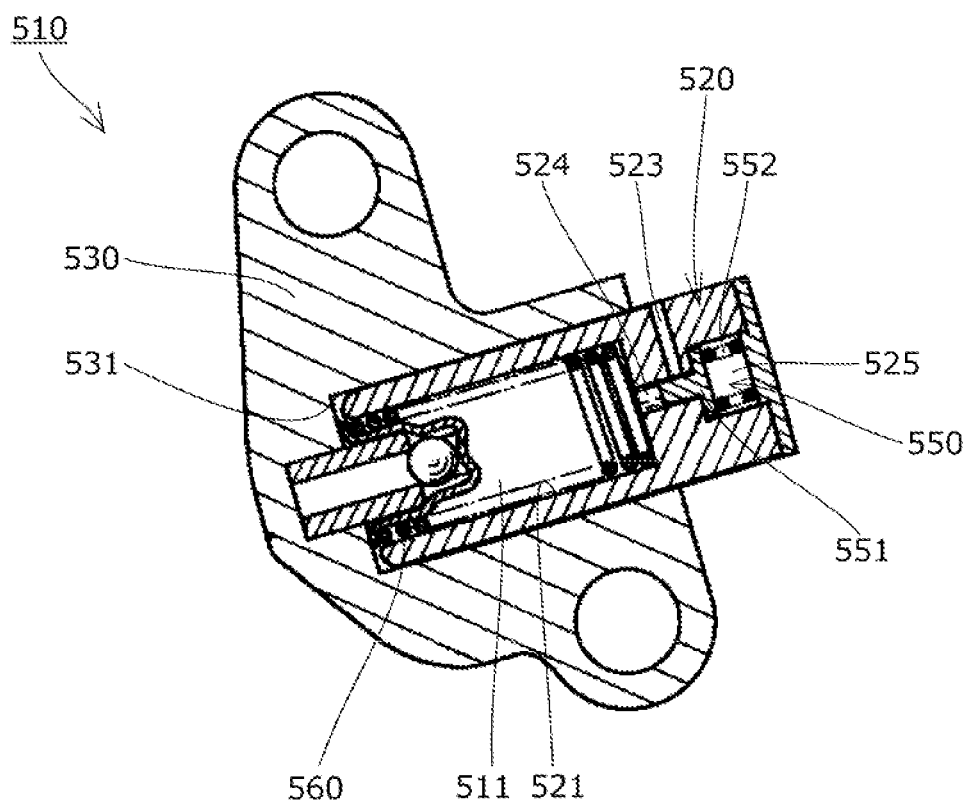
FIG. 7 is a cross-sectional view illustrating a tensioner of related art.

In the embodiment described above, the oil passing groove 51d is formed in the valve member 51. Alternatively, oil passing grooves 21e may be formed only in the inner circumferential surface of the internal relief hole 21c that is arranged opposite the outer circumferential surface of the valve member 51 as shown in FIG. 6. Also, the oil passing grooves 21e and 51d may be formed in both of the outer circumferential surface of the valve member 51 and the inner circumferential surface of the internal relief hole 21c.

In the embodiment described above, the oil passing grooves 51d extend from the rear end to the front end of the valve body 51a as shown in FIG. 3A, FIG. 3B, or FIG. 4. When the oil passing grooves 51d are formed to the valve body 51a, they only need to reach at least the rear end of the valve body 51a. When the oil passing grooves 51d are formed to the internal relief hole 21c, they only need to reach at least the front end of the internal relief hole 21c.

In the embodiment described above, the oil passing groove 51d is formed such that its cross-sectional area (width or depth) does not change along the front to back direction. Alternatively, the oil passing groove 51d may be formed such that its cross-sectional area (width or depth) changes along the front to back direction.

In the embodiment described above, the partition part 21b that divides the interior of the plunger hole 21a into the oil pressure chamber 11 and relief space 12 is integrally formed on the inner circumferential wall of the plunger hole 21a. The partition part 21b is not limited to this specific form. For example, the partition part 21b may be formed separately from the plunger 20, and disposed in the plunger hole 21a.

In the embodiment described above, the plunger 20 is made up of two components, the plunger body 21 and cap member 22. The plunger 20 is not limited to this specific form. For example, when the partition part 21b is formed separately from the plunger 20 as mentioned above, the plunger 20 could be configured as a single component.

In the embodiment described above, the valve body 51a is columnar and the internal relief hole 21c is cylindrical. These components are not limited to these specific forms.

For example, the valve body 51a and the internal relief hole 21c may respectively be formed in a polygonal column and polygonal cylinder.

What is claimed is:

1. A tensioner comprising:
a plunger having a plunger hole that is open on a rear side;
a housing having a plunger bore that is open on a front side and accommodates the plunger;
a main biasing unit that is accommodated so as to freely expand and contract inside an oil pressure chamber formed between the plunger and the plunger bore and that biases the plunger toward the front side; and
a relief mechanism that releases oil inside the oil pressure chamber to outside of the plunger when oil pressure in the oil pressure chamber rises, wherein
the relief mechanism includes a partition part that partitions an interior of the plunger hole into the oil pressure chamber and a relief space and that has an internal relief hole connecting the oil pressure chamber with the relief space, a valve member at least partly positioned inside the internal relief hole such as to be able to approach and separate from the oil pressure chamber, a valve biasing unit biasing the valve member toward the oil pressure chamber, and an external relief hole formed in the plunger and connecting the relief space with outside of the plunger,
a movement restricting part that restricts movement of the valve member toward the oil pressure chamber is formed in the partition part,
an oil passing groove is formed in at least one of an outer circumferential surface of the valve member and an inner circumferential surface of the internal relief hole, the outer circumferential surface and the inner circumferential surface facing each other, and
the valve member and the internal relief hole are formed such that, as the valve member moves away from the oil pressure chamber, an area where the outer circumferential surface of the valve member and the inner circumferential surface of the internal relief hole face each other decreases along a moving direction of the valve member.

2. The tensioner according to claim 1, wherein the oil passing groove is formed in the outer circumferential surface of the valve member.

3. The tensioner according to claim 1, wherein the plunger includes a plunger body having the plunger hole, and a cap member attached to a front end of the plunger body, and the partition part is formed integrally on an inner circumferential wall of the plunger hole.

4. The tensioner according to claim 1, wherein the valve member includes a columnar valve body, and the internal relief hole is cylindrical.

5. A tensioner comprising:
a plunger having a plunger hole that is open on a rear side;
a housing having a plunger bore that is open on a front side and accommodates the plunger;
a main biasing unit that is accommodated so as to freely expand and contract inside an oil pressure chamber formed between the plunger and the plunger bore and that biases the plunger toward the front side; and
a relief mechanism that releases oil inside the oil pressure chamber to outside of the plunger when oil pressure in the oil pressure chamber rises, wherein
the relief mechanism includes a partition part that partitions an interior of the plunger hole into the oil pressure chamber and a relief space and that has an internal relief hole connecting the oil pressure chamber with the relief space, a valve member at least partly positioned inside the internal relief hole such as to be able to approach and separate from the oil pressure chamber, a valve biasing unit biasing the valve member toward the oil pressure chamber, and an external relief hole formed in the plunger and connecting the relief space with outside of the plunger,
a movement restricting part that restricts movement of the valve member toward the oil pressure chamber is formed in the partition part,
an oil passing groove is formed in at least one of an outer circumferential surface of the valve member and an inner circumferential surface of the internal relief hole, the outer circumferential surface and the inner circumferential surface facing each other, and
the oil passing groove is formed in the outer circumferential surface of the valve member.

6. A tensioner comprising:
a plunger having a plunger hole that is open on a rear side;
a housing having a plunger bore that is open on a front side and accommodates the plunger;
a main biasing unit that is accommodated so as to freely expand and contract inside an oil pressure chamber formed between the plunger and the plunger bore and that biases the plunger toward the front side; and
a relief mechanism that releases oil inside the oil pressure chamber to outside of the plunger when oil pressure in the oil pressure chamber rises, wherein
the relief mechanism includes a partition part that partitions an interior of the plunger hole into the oil pressure chamber and a relief space and that has an internal relief hole connecting the oil pressure chamber with the relief space, a valve member at least partly positioned inside the internal relief hole such as to be able to approach and separate from the oil pressure chamber, a valve biasing unit biasing the valve member toward the oil pressure chamber, and an external relief hole formed in the plunger and connecting the relief space with outside of the plunger,
a movement restricting part that restricts movement of the valve member toward the oil pressure chamber is formed in the partition part,
an oil passing groove is formed in at least one of an outer circumferential surface of the valve member and an inner circumferential surface of the internal relief hole, the outer circumferential surface and the inner circumferential surface facing each other,
the plunger includes a plunger body having the plunger hole, and a cap member attached to a front end of the plunger body, and
the partition part is formed integrally on an inner circumferential wall of the plunger hole.

7. A tensioner comprising:
a plunger having a plunger hole that is open on a rear side;
a housing having a plunger bore that is open on a front side and accommodates the plunger;
a main biasing unit that is accommodated so as to freely expand and contract inside an oil pressure chamber formed between the plunger and the plunger bore and that biases the plunger toward the front side; and
a relief mechanism that releases oil inside the oil pressure chamber to outside of the plunger when oil pressure in the oil pressure chamber rises, wherein
the relief mechanism includes a partition part that partitions an interior of the plunger hole into the oil pressure chamber and a relief space and that has an internal relief hole connecting the oil pressure chamber with the relief space, a valve member at least partly positioned inside the internal relief hole such as to be able to approach and separate from the oil pressure chamber, a valve biasing unit biasing the valve member toward the oil pressure chamber, and an external relief hole formed in the plunger and connecting the relief space with outside of the plunger, a movement restricting part that restricts movement of the valve member toward the oil pressure chamber is formed in the partition part, an oil passing groove is formed in at least one of an outer circumferential surface of the valve member and an inner circumferential surface of the internal relief hole, the outer circumferential surface and the inner circumferential surface facing each other, the valve member includes a columnar valve body, and the internal relief hole is cylindrical.

* * * * *